(12) United States Patent
Ranson et al.

(10) Patent No.: US 10,251,154 B2
(45) Date of Patent: Apr. 2, 2019

(54) DISTRIBUTED ANTENNA SYSTEM MEASUREMENT RECEIVER

(71) Applicant: CommScope Technologies LLC, Hickory, NC (US)

(72) Inventors: Christopher Goodman Ranson, Concord, VA (US); Mathias Schmalisch, Augsburg (DE)

(73) Assignee: CommScope Technologies LLC, Hickory, NC (US)

( * ) Notice: Subject to any disclaimer, the term of this patent is extended or adjusted under 35 U.S.C. 154(b) by 210 days.

(21) Appl. No.: 15/119,985

(22) PCT Filed: Feb. 12, 2015

(86) PCT No.: PCT/US2015/015684
§ 371 (c)(1),
(2) Date: Aug. 18, 2016

(87) PCT Pub. No.: WO2015/126730
PCT Pub. Date: Aug. 27, 2015

(65) Prior Publication Data
US 2017/0070975 A1  Mar. 9, 2017

Related U.S. Application Data

(60) Provisional application No. 61/941,217, filed on Feb. 18, 2014.

(51) Int. Cl.
*H04W 72/00* (2009.01)
*H04B 7/155* (2006.01)
(Continued)

(52) U.S. Cl.
CPC ...... *H04W 72/005* (2013.01); *H04B 7/15507* (2013.01); *H04B 17/21* (2015.01);
(Continued)

(58) Field of Classification Search
None
See application file for complete search history.

(56) References Cited

U.S. PATENT DOCUMENTS

| | | | |
|---|---|---|---|
| 8,797,889 B2 * | 8/2014 | Parkvall | H04W 24/10 370/248 |
| 2009/0061940 A1 | 3/2009 | Scheinert et al. | |

(Continued)

OTHER PUBLICATIONS

European Patent Office, "Partial EP Search Report from EP Application No. 15751932.3 dated Sep. 22, 2017", "From foreign counterpart of U.S. Appl. No. 15/119,985", dated Sep. 22, 2017, pp. 1-9, Published in: EP.

(Continued)

*Primary Examiner* — Chi H Pham
*Assistant Examiner* — Vladislav Y Agureyev
(74) *Attorney, Agent, or Firm* — Fogg & Powers LLC

(57) ABSTRACT

Certain features relate to configuring a remote unit in a distributed antenna system (DAS) to switch between a baseband mode of operation and a measurement receiver mode of operation. In the baseband mode of operation, the remote unit can transmit a subset of baseband channels to a head-end unit or an extension unit of the DAS. The subset of baseband channels can carry wireless communication information. In the measurement receiver mode, the remote unit can transmit wideband data to the head-end unit or the extension unit of the DAS. The wideband data can include one or more of a measurement data for additional baseband channels other than the subset of baseband channels and information for use by the head-end unit to modify a configuration of the distributed antenna system.

20 Claims, 5 Drawing Sheets

(51) Int. Cl.
*H04B 17/21* (2015.01)
*H04B 17/29* (2015.01)
*H04W 24/08* (2009.01)
*H04W 72/04* (2009.01)
*H04W 88/08* (2009.01)

(52) U.S. Cl.
CPC ............ *H04B 17/29* (2015.01); *H04W 24/08* (2013.01); *H04W 72/042* (2013.01); *H04W 72/0413* (2013.01); *H04W 88/085* (2013.01)

(56) References Cited

U.S. PATENT DOCUMENTS

| | | | | |
|---|---|---|---|---|
| 2010/0048206 | A1* | 2/2010 | Agashe | H04H 20/26 455/432.1 |
| 2010/0189170 | A1* | 7/2010 | Wiwel | H04L 27/01 375/231 |
| 2011/0158081 | A1* | 6/2011 | Wang | H03F 1/304 370/201 |
| 2012/0039320 | A1 | 2/2012 | Lemson et al. | |
| 2012/0309328 | A1* | 12/2012 | Morrison | H04B 1/525 455/78 |
| 2012/0329523 | A1* | 12/2012 | Stewart | H03F 1/3247 455/562.1 |
| 2013/0100907 | A1* | 4/2013 | Liu | H04L 5/0023 370/329 |
| 2013/0188753 | A1 | 6/2013 | Tarlazzi et al. | |
| 2013/0201916 | A1 | 8/2013 | Kummetz et al. | |
| 2013/0337750 | A1 | 12/2013 | Ko | |
| 2014/0024402 | A1 | 1/2014 | Singh | |
| 2014/0219162 | A1* | 8/2014 | Eyuboglu | H04W 16/26 370/315 |

OTHER PUBLICATIONS

International Search Authority, "International Search Report and Written Opinion from PCT Application No. PCT/US2015/015684", dated Apr. 28, 2015, pp. 1-13, Published in: WO.

European Patent Office, "Extended European Search Report for EP Application No. 15751932.3", "from Foreign Counterpart to U.S. Appl. No. 15/119,985", dated Jan. 3, 2018, Published in: EP.

* cited by examiner

BASEBAND CHANNEL TRANSPORT DURING NORMAL OPERATION

BASEBAND DATA AND WIDEBAND DATA COMBINED IN THE TRANSPORT FRAME

DISTRIBUTED ANTENNA SYSTEM MEASUREMENT RECEIVER

CROSS-REFERENCE TO RELATED APPLICATION

This application is a U.S. National Stage application of PCT Application Serial No. PCT/US2015/015684, filed Feb. 12, 2015 and titled "Distributed Antenna System Measurement Receiver," which claims the benefit of U.S. Provisional Application Ser. No. 61/941,217, filed Feb. 18, 2014 and titled "A Distributed Antenna System (DAS) Uplink Measurement Receiver," the contents of all of which are incorporated herein by reference.

TECHNICAL FIELD

The present disclosure relates generally to telecommunications systems and more particularly (although not exclusively) to distributed antenna systems that can process baseband channels and wideband data with different modes of operation.

BACKGROUND

A telecommunications system, such as a distributed antenna system (DAS), can include one or more head-end units and multiple remote units coupled to each head-end unit. A DAS can be used to extend wireless coverage in an area. Head-end units can be coupled to one or more base transceiver stations that can each manage wireless communications for different cell sites. A head-end unit can receive downlink signals from the base transceiver station and distribute downlink signals in analog or digital form to one or more remote units. The remote units can transmit the downlink signals to user equipment devices within coverage areas serviced by the remote units. In the uplink direction, signals from user equipment devices may be received by the remote units. The remote units can transmit the uplink signals received from user equipment devices to the head-end unit. The head-end unit can transmit uplink signals to the serving base transceiver stations.

Typically, components of a DAS can be designed to transmit and receive baseband data as a discrete set of baseband channels selected from the entire network spectrum. Other channels in the network spectrum may include additional information that components of a DAS can use for system optimization and configuration. In some aspects, it may be desirable to configure components of a DAS to process both baseband data carrying wireless communication information and wideband data carrying information related to the entire network spectrum.

SUMMARY

In one aspect, a method is provided. The method can include configuring a remote unit in a distributed antenna system to operate in a baseband mode. The method can also include transmitting, by the remote unit, a subset of baseband channels to a head-end unit or an extension unit of the distributed antenna system based on the remote unit being configured to operate in the baseband mode. The subset of baseband channels carry wireless communication information. The method can further include configuring the remote unit to operate in a measurement receiver mode. The method can also include transmitting, by the remote unit, a wideband data to the head-end unit or the extension unit of the distributed antenna system based on the remote unit being configured to operate in the measurement receiver mode. The wideband data includes one or more of a measurement data for the subset of baseband channels and additional baseband channels other than the subset of baseband channels and information for use by the head-end unit to modify a configuration of the distributed antenna system.

In another aspect, a distributed antenna system is provided. The distributed antenna system can include a remote unit configured to switch between a baseband mode and a measurement receiver mode. The remote unit can also transmit a subset of baseband channels based on being configured to operate in the baseband mode. The remote unit can also transmit wideband data based on being configured to operate in the measurement receiver mode. The distribute antenna system can also include a head-end unit that is communicatively coupled to the remote unit. The head-end unit can switch between the baseband mode and the measurement receiver mode. The head-end unit can also receive the subset of baseband channels transmitted by the remote unit based on being configured to operate in the baseband mode. The head-end unit can also receive the wideband data transmitted by the remote unit based on being configured to operate in the measurement receiver mode. The subset of baseband channels carry wireless communication information. The wideband data includes one or more of a measurement data for the subset of baseband channels and additional baseband channels other than the subset of baseband channels and information for use by the head-end unit to modify a configuration of the distributed antenna system.

In another aspect, a head-end unit of a distributed antenna system is provided. The head-end unit can include a processing device configured to select a baseband mode or a measurement receiver mode. The head-end unit can also include a communications interface. The communications interface can communicate a subset of baseband channels with one or more remote units based on the processing device selecting the baseband mode. The communications interface can also communicate a wideband data with the one or more remote units based on the processing device selecting the measurement receiver mode. The subset of baseband channels carry wireless communication information. The wideband data includes one or more of a measurement data for the subset of baseband channels and additional baseband channels other than the subset of baseband channels and information for use by the head-end unit to modify a configuration of the distributed antenna system.

DETAILED DESCRIPTION

Figure 1:
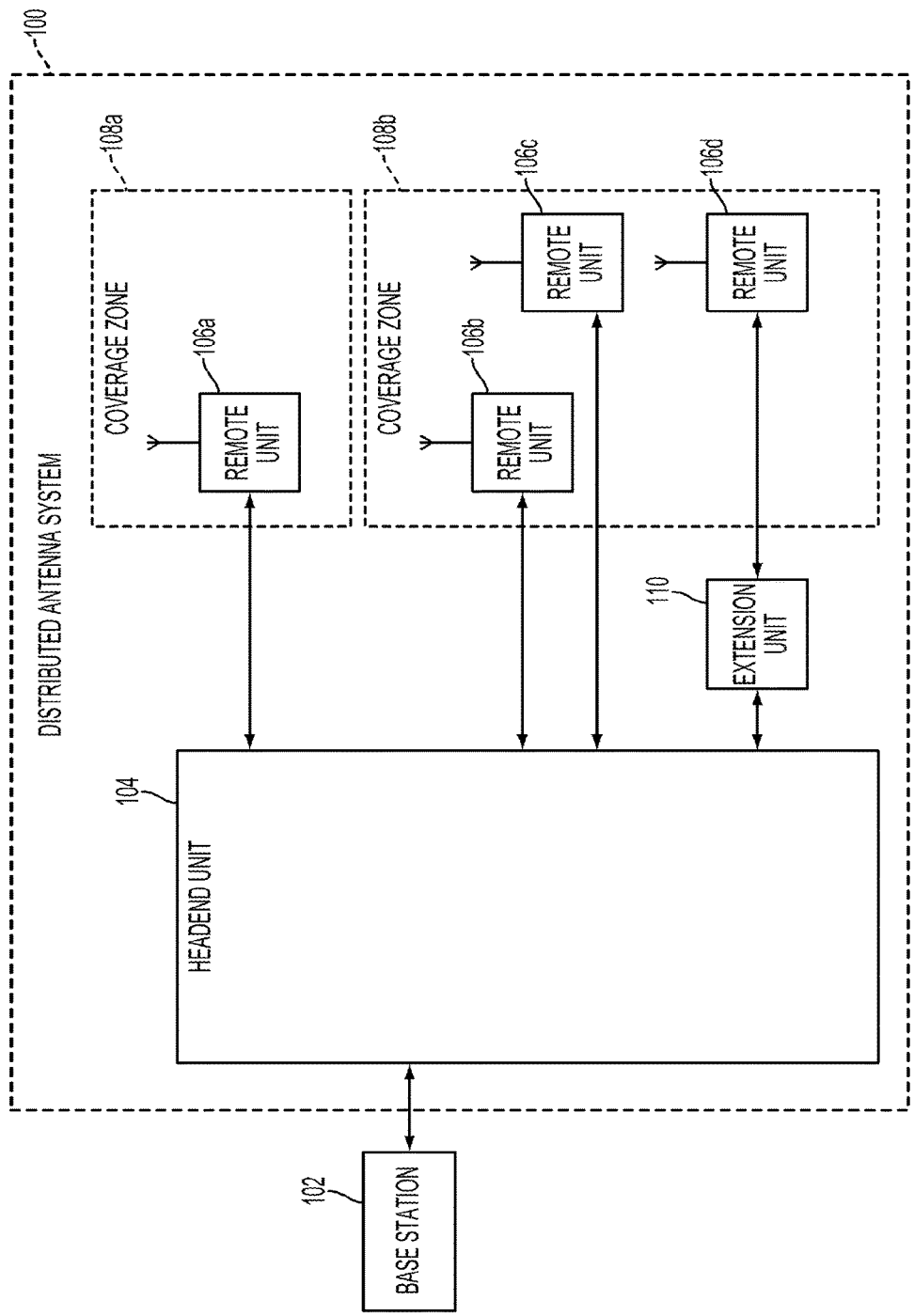
FIG. 1 is a block diagram depicting an example of a base station and a distributed antenna system that can be configured to operate in a baseband mode or a measurement receiver mode according to one aspect of the present disclosure.

Certain aspects and features of the present disclosure relate to a distributed antenna system (DAS) that can be configured to switch between a baseband mode of operation and a measurement receiver mode of operation. In the baseband mode of operation, one or more remote units can provide a subset of baseband channels carrying wireless communication information and mobile device traffic. Baseband may describe signals and systems whose range of frequencies is measured from close to 0 hertz to a cut-off frequency (e.g., a maximum bandwidth or highest signal frequency). By communicating using a subset of baseband channels, remote units can communicate using signals carried on discrete frequency ranges selected from an overall carrier spectrum. Wideband data can refer to data carried on the overall carrier spectrum. Operating in the baseband mode can include communicating the subset of baseband channels among head-end units and remote units within the DAS without sending at least some of the wideband data detected by the remote units. The subset of baseband channels can carry wireless communication information through the DAS.

In the measurement receiver mode of operation, the remote units can detect and send wideband data to a head-end unit or extension unit of the DAS. The wideband data can carry information related to all available channels in the carrier network and can be used by the head-end unit for DAS configuration and optimization. For example, the head-end unit can use information in the wideband data for measurement or configuration purposes. In an non-limiting example, the head-end unit can use information in the wideband data for scanning the uplink or downlink spectrum for additional active channels.

In some aspects, components of a DAS (such as a head-end unit, extension unit, and communicatively coupled remote units) can communicate using active communication channels within a specified band or frequency range rather than the entire band or frequency range of the carrier network. The active baseband channels can carry a subset of baseband signals from the entire wideband signal. For example, during a baseband mode of operation, a DAS may send the baseband representation of cellular communications channels. For example, a Personal Communications Service (PCS) band used by the DAS may be 60 MHz. The DAS may, depending on the operators using the DAS, transmit signals within three 5 MHz Universal Mobile Telecommunications System (UMTS) channels from this 60 MHz of spectrum. In the downlink direction, the head-end unit can extract the three channels and transport the extracted channels to one or more remote units of the DAS. In the uplink direction, the remote unit can extract the actively-configured channels and remove or attenuate unused or unnecessary spectrum from received signals before transporting uplink signals to the extension unit or head-end unit. Thus, one or more devices in a DAS may extract communication channels of interest for transport to other units rather than transporting all received channels.

These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

FIG. 1 depicts an example of a DAS 100 that can be configured to operate in either a baseband mode or a measurement receiver mode according to certain aspects. The DAS 100 can include a network of spatially separated antenna nodes from one or more base stations to mobile devices within a geographic area or structure. For example, the DAS 100 can communicate signals between a base station 102 and mobile devices via, for example, a head-end unit 104, and remote units 106*a-d*. Although FIG. 1 depicts only one base station 102 for illustrative purposes, it is understood that the DAS 100 can be used to provide wireless communication from multiple base stations.

The head-end unit 104 of the DAS 100 can receive uplink signals from remote units 106*a-d* and downlink signals from the base station 102. Any suitable communication link can be used for communication between the base station 102 and the head-end unit 104. Examples of suitable communication links include a direct connection or a wireless connection. A direct connection can include, for example, a connection via a copper cable, optical fiber, or other suitable communication medium. A wireless connection can include, for example, a connection using the 802.11 wireless local area network standard. In some aspects, the head-end unit 104 can be communicatively coupled to remote units 106*a-d* via an extension unit 110 or other intermediate devices.

Each of the remote units 106*a-d* can provide wireless communication to mobile devices in one or more coverage zones 108*a-b* serviced by the remote units 106*a-d*. For example, remote unit 106*a* can provide wireless communication to mobile devices within coverage zone 108*a*. Similarly, remote units 106*b-d* can provide wireless communication to mobile devices within coverage zone 108*b*. Remote units 106*a-d* can also receive uplink signals transmitted by mobile devices in the coverage zones 108*a*, 108*b*. Uplink signals received by the remote units 106*a-c* can be provided to the head-end unit 104. The remote unit 106*d* can provide uplink signals to extension unit 110. The extension unit 110, as an intermediary device, can provide the uplink signals to the head-end unit 104. The head-end unit 104 can combine uplink signals received from remote units 106*a-d* for transmission to the base station 102.

One or more of the remote units 106*a-d*, extension unit 110, and head-end unit 104 can operate in either a baseband mode or a measurement receiver mode. Operating in the baseband mode can include sending active baseband channels through the system and excluding some of the wideband data. For example, a subset of baseband channels from the wideband spectrum can be transmitted in a downlink direction to mobile devices within the coverage zones 108*a-b*. In the uplink direction, the remote units 106*a-d* can be configured to receive and digitize the entire wideband spectrum. In a baseband mode of operation, the remote units 106*a-d* can apply signal processing and filtering on uplink signals to extract the appropriate subset of baseband channels for transmission through the DAS 100. For example, remote units 106*a-d* can include wideband RF transceivers to receive the wideband signal and a signal processor for extracting the subset of baseband channels in the digital domain. In another aspect, the remote units 106a-d can extract the subset of baseband channels using a zero IF receiver. The remote units 106a-d can then provide the extracted subset of baseband channels upstream to extension unit 110 and head-end unit 104.

Operating in the measurement receiver mode can include using one or more of the remote units 106a-d to gather and send wideband data to the head-end unit 104 or extension unit 110. In some aspects, remote units 106a-d can operate in a baseband mode and a measurement receiver mode simultaneously. For example, the remote units 106a-d can be configured to simultaneously operate in baseband mode and a measurement receiver mode during periods where additional bandwidth is available on the communication links between the head-end unit 104 and the remote units 106a-d than is required for baseband mode operation. The additional available bandwidth can be used by the remote units 106a-d to provide wideband data for measurement receiver purposes.

The head-end unit 104 can process the wideband data. In some aspects, the head-end unit 104 can process the wideband data by scanning the uplink or downlink spectrum for active channels. Other active channels can include downlink signals being provided by base stations not connected to the DAS 100. For example, a macro-cell outside of the DAS 100 coverage zones may transmit signals on active channels that leak into the receivers of the head-end unit 104. Active channels can also include uplink signals being transmitted within the coverage zones serviced by the DAS 100. For example, the head-end unit 104 can process the wideband data to detect uplink channels not used by the DAS 100. The uplink channels may include the wireless traffic that exists inside the building covered by the DAS 100. The uplink active channels can be used by the DAS 100 to make recommendations to the building owner or network operator regarding wireless traffic in the building and the amount of traffic not part of the DAS 100. Network operators may configure the DAS 100 to include the uplink active channels, thereby expanding the operational bandwidth of the DAS 100.

The head-end unit 104 can also scan the uplink spectrum for active channels for E911 mobile location purposes. For example, a mobile device inside the building covered by the DAS 100 may not be serviced by the DAS 100. If the mobile device not serviced by the DAS 100 places an E911 call, the Public-Safety Answering Point can inform the DAS 100 that an emergency call was placed within the building. In response, the head-end unit 104 could scan the uplink spectrum to identify the mobile unit that placed the E911 call and report the location of the mobile unit to the Public-Safety Answering Point.

In other aspects, the wideband data can be used by components of the DAS 100 to determine the relative distance between one of the remote units 106a-d to another one of the remote units 106a-d. In other aspects, the head-end unit 104 can use the wideband data to configure the system for optimizing handover to neighboring macro-cells. In other aspects, the wideband data can be used to support Long-Term Evolution (LTE) carrier aggregation between neighboring macro-cells and cells of the DAS 100.

Figure 2:
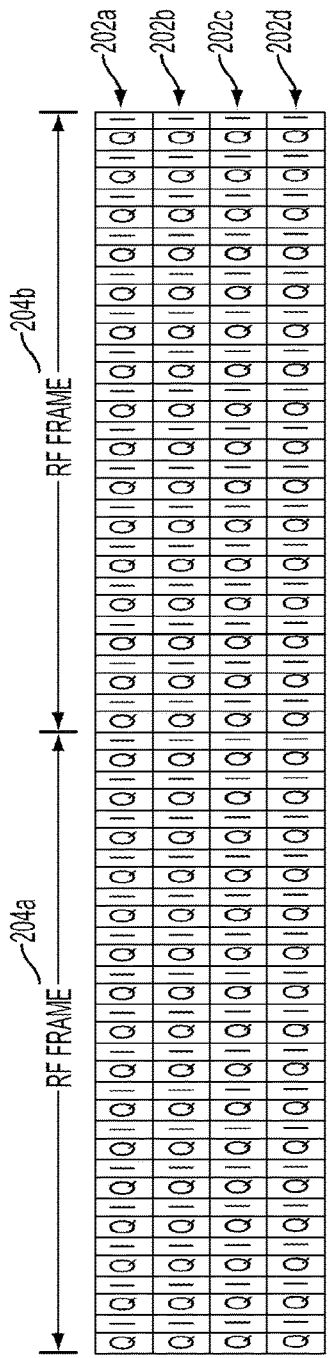
FIG. 2 is an example of a transmit frame for use in a distributed antenna system configured for a baseband mode of operation according to one aspect of the present disclosure.
Figure 3:
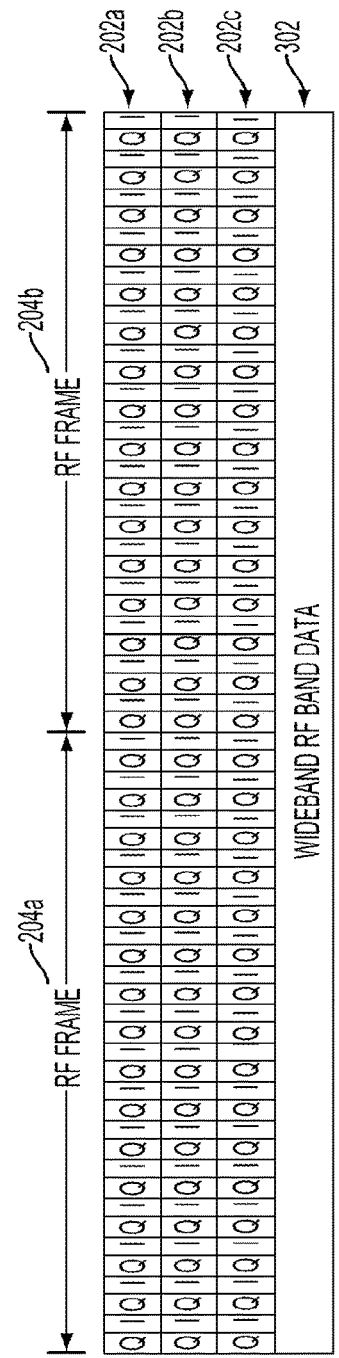
FIG. 3 is an example of a transmit frame for use in a distributed antenna system configured for a measurement receiver mode of operation according to one aspect of the present disclosure.

Baseband channels and wideband data that are transported through the DAS 100 can be conveyed on radio frequency carrier signals in the form of transmit frames. FIGS. 2-3 depict examples of respective transmit frames for carrying data from baseband channels and wideband data. For example, FIG. 2 shows an example of a transmit frame for use in a DAS 100 during a baseband mode of operation. In the baseband mode of operation, components of a DAS 100 may provide wireless communication information to connected mobile devices by transporting baseband data. Baseband data can be conveyed as in-phase and quadrature (IQ) data pairs. IQ data may represent changes in magnitude and phase of a sine wave that can be used to encode information upon a sine wave using one or more types of modulation. Modulation can involve modifying a higher frequency signal using a lower frequency signal. The higher frequency signal may be referred to as a carrier signal and the lower frequency signal may be referred to as a message signal, information signal, or modulating signal. The IQ sample pairs, or combinations of IQ sample pairs, may represent different cellular channels in the DAS 100. FIG. 2 depicts four radio frequency (RF) streams 202a-d as four rows of IQ pairs. Each RF stream 202a-d is divided into two RF frames 204a-b. The number of RF streams may correspond to the number of antennas at the remote unit. In the depicted representation, any grouping of IQ pairs may represent a channel and may be continuous or non-contiguous. Therefore, a baseband channel may include IQ pairs from one, multiple, or all of the RF streams 202a-d.

In some aspects, the number of IQ pairs used to transmit all of the active channels in the DAS 100 may be less than the total number of IQ pairs available. For example, more bandwidth may be available in the DAS 100 than is used by the mobile devices. In such a scenario, the removal of one or more RF streams to make room for transmitting the wideband RF data within the same transmit frame may have no impact on mobile devices. For example, FIG. 3 shows an example of modified versions of the transmit frames 204a, 204b from FIG. 2. In the modified transmit frames, data from baseband channels and wideband data are both transported during a measurement receiver mode of operation. By omitting or attenuating baseband data carried on RF stream 202d, the transmit frames have sufficient bandwidth to include wideband RF data 302.

For illustrative purposes, the wideband RF data 302 shown in FIG. 3 is associated with a single RF stream. In additional or alternative aspects, the wideband RF data may be distributed across multiple RF streams. The number of IQ pairs utilized by mobile devices and communicated by remote units may be variable. The number of IQ pairs used for transporting wideband RF data, however, may be fixed because the number of IQ pairs used for transporting wideband RF data can include all available bands rather than a configured subset of the bands. The number of IQ pairs used by the wideband RF data may be based upon, for example, an analog-to-digital converter sample rate.

The particular IQ pairs used to provide the subset of baseband channels and the wideband RF data when operating in the measurement receiver mode may also be dynamically determined or adjusted to avoid negatively impacting mobile device traffic. For example, in some aspects, mobile devices may transmit uplink information using IQ pairs on the fourth RF stream 202d. In the event that the fourth RF stream 202d is being used for wideband data, as shown in FIG. 3, the remote unit 106 receiving the IQ data may convey the IQ pairs received from the mobile devices to the head-end unit 104 or extension unit 110 on the third RF stream 202d. In other aspects, the particular RF stream used to provide the wideband data can be dynamically adjusted. For example, when operating in the measurement receiver mode, the head-end unit 104 can instruct the remote units 106a-d to transmit wideband data on a third RF stream 202c instead of the fourth RF stream 202d. The DAS 100 can thereby fully utilize the maximum number of RF streams, providing both baseband data and wideband data, without disrupting existing traffic to and from mobile devices.

While the DAS 100 is configured to operate in a measurement receiver mode, it may be beneficial to process the wideband detected by remote units at the head-end unit 104 or extension unit 110. The head-end unit 104 or extension unit 110 may have greater processing power than the remote units 106a-d (or the remote may not have processing capability at all).

Figure 4:
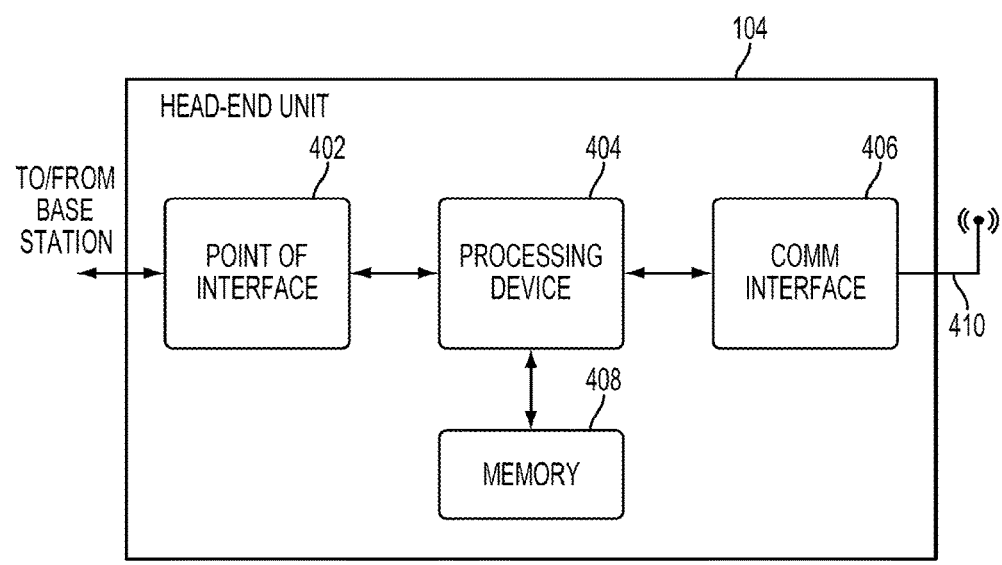
FIG. 4 is a block diagram depicting an example of a head-end unit according to one aspect of the present disclosure.

FIG. 4 is a block diagram showing an example of the head-end unit 104. The head-end unit 104 may include, for example, a point of interface 402 for interfacing with the base station 102 and a communications interface 406 for providing communications to remote units 106a-d and extension unit 110. The point of interface 402 can include any wired or wireless connection for communicating with the base station 102. The communications interface 406 can include circuitry for conveying data received from the base station 102 to an appropriate form for transmission to remote units 106a-d. For example, the communications interface 406 can include RF circuitry for converting digital data received from the base station 102 and processed by the processing device 404 to an analog RF signal for transmission to remote units 106-d and extension unit 110. The head-end unit 104 can also include a processing device 404, which can include any suitable device for providing processing capabilities. Examples of the processing device 404 can include a field programmable gate array (FPGA), application specific integrated circuit (ASIC), or digital signal processor (DSP). The head-end unit 104 can further include a memory 408 coupled to the processing device 404. The memory 408 can include any non-transitory media for storing program code defining the operations of the head-end unit 104. Non-limiting examples of memory 408 can include read-only memory (ROM), random-access memory (RAM), optical storage, magnetic storage, flash memory, or any other medium from which the processing device 404 can read program code.

The head-end unit 104 can be configured to switch between a baseband mode and a measurement receiver mode. For example, the memory 408 can include program code defining instructions that, when executed by the processing device 404, cause the head-end unit 104 to switch between a baseband mode and a measurement receiver mode. In some aspects, by switching to a measurement receiver mode, the head-end unit 104 can automatically send a signal instructing remote units 106a-d to switch to a measurement receiver mode. In the baseband mode of operation, the head-end unit 104 can provide a subset of baseband channels from the wideband spectrum between base station 102 and remote units 106a-d via the communications interface 406. For example, in the case of the PCS band, the head-end unit 104 may transmit 5 MHz UMTS baseband channels to the remote units 106a-d in the downlink direction and receive similar baseband channels from the remote units 106a-d in the uplink direction. In the measurement receiver mode of operation, the head-end unit 104 may receive and process the entire digitized spectrum (e.g., the entire wideband data). For example, in the case of the PCS band, the head-end unit 104 may receive the entire 60 MHz of spectrum so that the DAS 100 can scan for additional active channels.

The head-end unit 104 can receive the wideband data from remote units via the communications interface 406. For example, in some aspects, remote units 106a-d can be configured to operate in the measurement receiver mode and in response transmit the wideband data to the head-end unit 104. To support the transport of wideband data in the measurement receiver mode, remote units 106a-d can be configured to frame and de-frame wideband data along with other packetized data conveyed for wireless communication.

Figure 5:
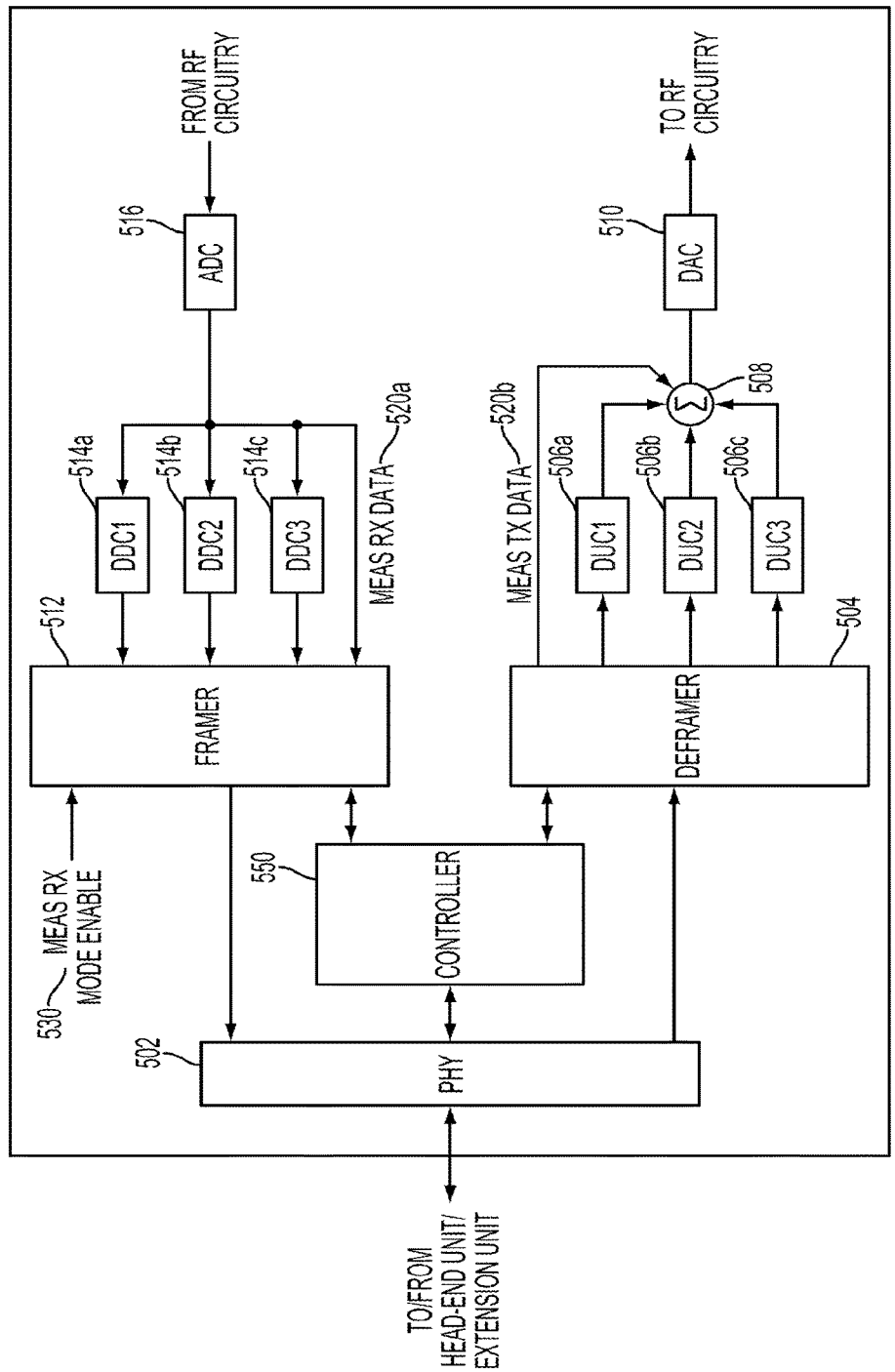
FIG. 5 is a block diagram depicting an example of a remote unit configured to operate in a baseband mode or a measurement receiver mode according to one aspect of the present disclosure.

For example, FIG. 5 depicts a logical block diagram of an example of a remote unit 106 configured to support a measurement receiver mode of operation. The remote unit can receive an enable command 530 from the head-end unit or extension unit instructing the remote unit to operate in a measurement receiver mode. A controller 550 can determine whether the remote unit 106 is configured to operate in a baseband mode or measurement receiver mode. Non-limiting examples of a controller in the remote unit 106a can include an FPGA, ASIC, or other processing device.

In the downlink direction, data can be received from a head-end unit 104 or an extension unit 110. In some aspects, the data can be formatted as a series of frames. The data can be received at a physical layer device 502 and provided to a deframer 504. The physical layer device 502 can provide the interface to the base station 102. A non-limiting example of a physical layer device 502 is an Ethernet physical transceiver. The deframer 504 can deframe the received data in separate data streams. The separate data streams can include both data streams carrying baseband data and wideband data. Each of the resulting deframed data streams carrying baseband data can be provided to separate digital up-converters 506a-c. A deframed measurement data stream 520b carrying wideband data from the head-end unit or the extension unit may also be outputted by the deframer 504. The measurement data stream 520b carrying the wideband data and the up-converted data can be summed at summer 508 and provided to a digital-to-analog converter 510. The digital-to-analog converter 510 can process the combined signal to convert to an analog stream, which can be provided to RF circuitry for transmission.

In the uplink direction, analog uplink signals can be received from the RF circuitry and digitized by an analog-to-digital converter (ADC) 516. A digital uplink signal outputted from the ADC 516 can be split into multiple data streams. The uplink data streams can carry both baseband data and wideband data detected by the remote unit. For example, the digital uplink signal outputted from the ADC 516 can be split into separate data streams carrying baseband data and transmitted to each of one or more digital down-converters 514a-c. The digital down-converters 514a-c can down-convert the data streams carrying the baseband data and provide the down-converted streams to a framer 512. The digital uplink signal outputted from the ADC 516 can also be split into a measurement data stream 520a carrying wideband data that may be sent to the framer 512. The framer 512 can format the received wideband data and baseband data into transmit frames and provide the transmit frames to the physical layer device 502 for transmission to the head-end unit or extension unit.

Figure 6:
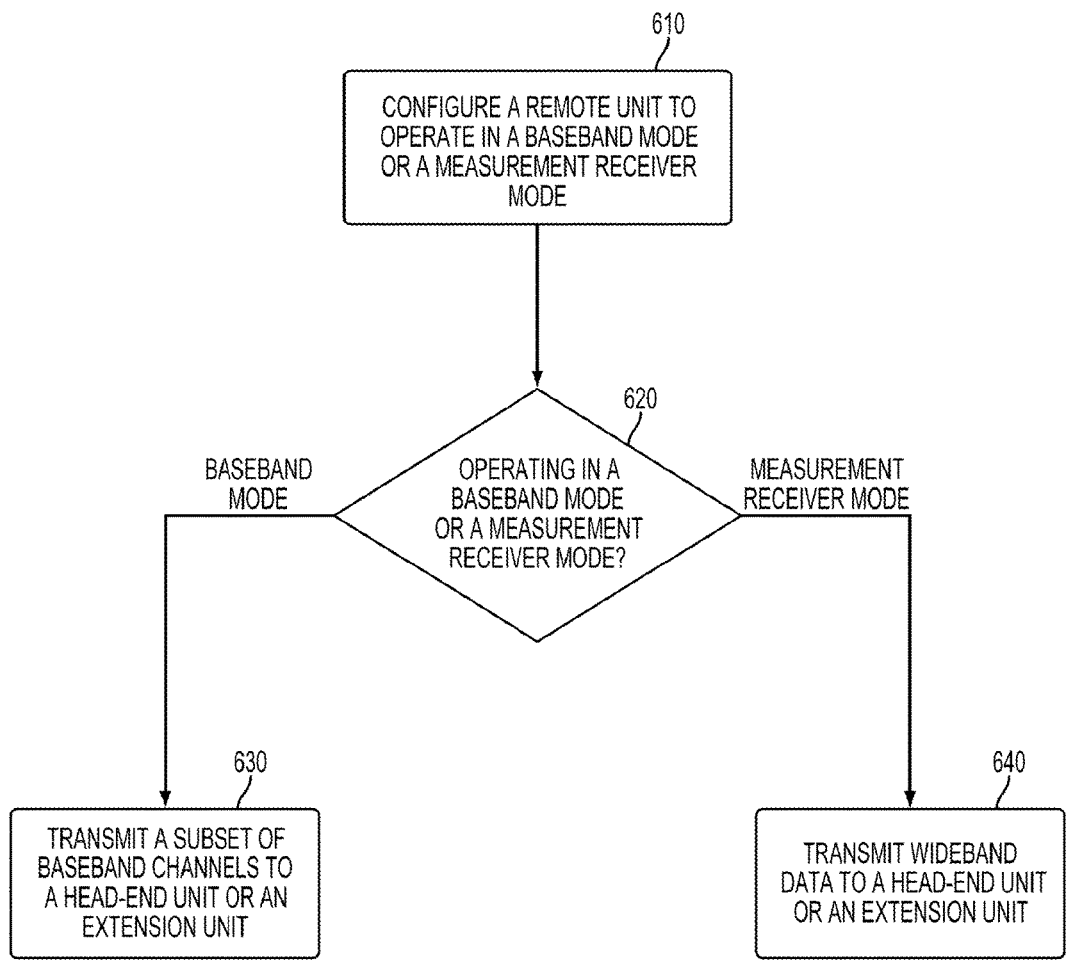
FIG. 6 is a flow chart depicting an example of a process for operating a remote unit of a distributed antenna system in a baseband mode or a measurement receiver mode according to one aspect of the present disclosure.

FIG. 6 is a flow chart depicting a process for operating a remote unit of a DAS 100 in a baseband mode or a measurement receiver mode according to certain aspects. While the process depicted in FIG. 6 is described with respect to FIGS. 1, 4, and 5, other implementations are possible.

In block 610, the head-end unit 104 can configure the remote unit 106a to operate in either a baseband mode or a measurement receiver mode. For example, the head-end unit 104 can provide a digital signal to the remote unit 106a that instructs the remote unit 106a to operate in a certain mode. In some aspects, the head-end unit 104 can instruct the remote unit 106a to switch between the baseband mode and the measurement receiver mode statically, periodically (e.g., based on a pre-determined schedule), or dynamically (e.g., based on satisfying one or more conditions). For example, the remote unit 106a may be configured to operate in the measurement receiver mode during system commissioning or during non-peak times of day so as not to potentially interfere with baseband user traffic.

A controller 550 in the remote unit 106a can determine whether the remote unit is configured to operate in a baseband mode or measurement receiver mode, as shown in block 620. In some aspects, the processing device 404 of the head-end unit 104 can determine whether the remote unit is configured to operate in a baseband mode or measurement receiver mode.

If the remote unit 106a is configured to operate in a baseband mode, the remote unit 106a can transmit a subset of baseband channels to the head-end unit 104 or extension unit 110, as shown in block 630. For example, the remote unit 106a can transmit IQ data pairs carrying baseband data on RF streams. In some aspects, the remote unit 106a can include multiple antennas, each transmitting a respective RF stream. In a baseband mode of operation, the remote unit 106a can provide a subset of baseband channels that include wireless communication information in the uplink direction from mobile devices in the coverage zone 108a to the head-end unit 104 for eventual transmission to base station 102.

If the remote unit 106a is configured to operate in a measurement receiver mode, the remote unit 106a can transmit wideband data to the head-end unit 104 or extension unit 110 as shown in block 640. For example, in some aspects, the remote unit 106a can remove, attenuate, or omit baseband data from one or more RF streams to increase the available bandwidth for including wideband data in the transmit frame. In some aspects, the wideband data can be distributed across multiple RF streams and transmitted by multiple antennas of the remote unit 106a. In additional aspects, based on being configured to operate in a measurement receiver mode, the remote unit 106a can combine both baseband data (carrying wireless communication information) and wideband data by framing both sets of data in a transmit frame.

Wideband data received by the remote unit can be used by the DAS 100 for various configuration and optimization functions. For example, during system commissioning, the DAS 100 can configure a given remote unit to send a beacon for determining proximity of the given remote unit to other remote units in physical locations that are close enough to receive a transmission from the given remote unit. One remote unit 106a may be configured to transmit the beacon, and other remote units 106b-c may be configured to listen for the beacon. A time-of-distance arrival calculation can be used for locating the relative positions of the remote units. For example, the remote units 106b-c that received the beacon can respond with acknowledgment signals. The remote unit 106a that transmitted the beacon can calculate the relative distances of 106b-c by measuring the roundtrip delay of the acknowledgment signals. In some aspects, the calculation for time-of-distance arrival can be performed by the head-end unit 104 by configuring the remote unit 106a that transmitted the beacon to forward all received acknowledgment signals to the head-end unit 104. The signaling used for time-of-distance arrival calculations can be provided on portions of the wideband spectrum not otherwise used by the DAS 100.

In other aspects, wideband data can be used for triangulation calculations for locating relative positions of remote units. For example, remote units 106a-b can provide beacon signals on wideband data to the head-end unit 104. The head-end unit 104 can compare the signal strength and time delay of the beacon signals transmitted by remote units 106a-b and determine the relative positions of remote units 106a-b. In other aspects, remote unit 106c can receive the beacon signals transmitted by remote unit 106a and determine the relative positions of remote units 106a-b.

In some aspects, the DAS 100 can switch between a baseband mode and a measurement receiver mode based on certain triggering events. For example, the DAS 100 can switch to a measurement receiver mode in response to the head-end unit 104 detecting that an emergency call was made by a mobile device. An emergency (e.g., 911) call may be placed by a mobile device within range of the DAS 100. The remote unit 106 or head-end unit 106 can detect that an emergency call was made. In response, the DAS 100 can switch to the measurement receiver mode to geolocate the mobile device. The DAS 100 may be able to locate the mobile device by scanning wideband data even if the mobile device is not served by the DAS 100.

In another aspect, the DAS 100 can use the remote units 106a-d as part of a channel measurement system to analyze transmissions to determine performance factors of the channels in the wideband spectrum. For example, the DAS 100 can determine whether signals will travel smoothly, without distortion or interference to determine the multipath environment that the system may experience in a structure. Distortion due to a multipath environment can cause problems in the DAS 100, as some frequencies can have higher attenuation than others. Multipath can cause distortion that may result in null coverage in certain parts of the building, causing an ongoing call to be dropped. By measuring the multipath environment, the DAS 100 can recommend to the building operator or network provider alternative configuration of remote units 106a-d to focus RF energy away from multipath distortion areas. Interference in the DAS 100 can be caused by an RF transmitter or jammer radiating energy in bands designed for cellular communications. By measuring interference in the DAS 100, the DAS 100 can identify the source of interference.

To measure distortion or interference in the DAS 100, the DAS 100 can use a remote unit 106a to send wideband data as wideband noise including a pseudo random (PN) sequence. A second remote unit 106b can receive the wideband data. The listening remote unit 106b can use adaptive filtering techniques for system identification to determine the impulse response of the environment between remote units 106a-b. For example, the listening remote unit 106b can use adaptive filtering techniques to determine the transfer function of the environment, which can model the present distortions and interference. The wideband data including the PN sequence received by remote unit 106b includes the original PN sequence convolved with the transfer function of the environment (the transmitted signal modified by the RF interferences and distortions of the environment. The original PN sequence and the signal received by the listening remote unit 106b can be passed through an adaptive filter to yield the transfer function of the environment. This processing can be performed in the head-end unit 104 or extension unit 110, and can be performed during system commissioning or during times when the system is unused. For example, the listening remote unit 106b can provide the signal received from remote unit 106a (the PN sequence convolved with the RF distortions) to the head-end unit 104 or extension unit 110, which can use an adaptive filter to return the transfer function of the environment. While a PN sequence is described here as the transmitted signal for illustrative purposes, any suitable and deterministic signal can be used to test the impulse response of the environment.

Another example of a scenario using the measurement receiver mode can include supporting macro-cell-to-DAS hand-over. A macro-cell can include a cell in the carrier network that provides the radio coverage served by base station 102. During system commissioning, macro-cells that are adjacent to the structure being serviced by the DAS 100 can be identified. Identifying the macro-cells can facilitate proper hand-in and hand-off of a mobile device that moves between the macro-cell and the coverage area of the DAS 100. Neighboring macro-cells can be identified by receiving RF data from the neighboring macro-cells at frequencies that may not be received when operating in baseband mode. The remote unit receiver can be tuned to receive a downlink band that includes baseband channels used by other remote units. A baseband channel used by a remote unit outside of the DAS 100 can include a broadcast control channel (BCCH) that is distinct from the BCCH used by remote units included in the DAS 100. The wideband data can be sent to the head-end unit or extension unit for scanning the broadcast control channel (BCCH) to identify neighboring macro-cells. In some examples, the macro-cell environment can change after commissioning of the DAS 100 (e.g., by adding new macro-cells cells, removing macro-cells, changing power levels of macro-cells, etc.). The DAS 100 can periodically scan for changes in the macro-cell environment and react accordingly to optimize the DAS 100 parameters for proper hand-over operations and for optimal DAS performance.

Another example of a scenario using the measurement receiver mode may include supporting or assisting in LTE carrier aggregation between neighbor macro-cells and DAS 100. For example, the DAS 100 may provide coverage within an office building and a cell tower external to the DAS 100 may provide LTE cellular phone coverage outside of the building. There may be coverage overlap between the outside LTE network and the internal DAS network where a mobile user may be connected to both. In such circumstances, the DAS 100 can communicate, coordinate, and cooperate with other networks by exchanging messages and data with one or more base stations or other LTE network components to allow for uplink or downlink signals to be aggregated or combined. This may allow for increased reliability, uplink/downlink speeds, or other advantages as compared with a DAS that does not support carrier aggregation.

While the present subject matter has been described in detail with respect to specific aspects and features thereof, it will be appreciated that those skilled in the art, upon attaining an understanding of the foregoing may readily produce alterations to, variations of, and equivalents to such aspects and features. Accordingly, it should be understood that the present disclosure has been presented for purposes of example rather than limitation, and does not preclude inclusion of such modifications, variations and additions to the present subject matter as would be readily apparent to one of ordinary skill in the art.

What is claimed is:

1. A method, comprising:
   configuring a remote unit in a distributed antenna system to operate in a baseband mode;
   transmitting, by the remote unit, a subset of baseband channels to a head-end unit or an extension unit of the distributed antenna system based on the remote unit being configured to operate in the baseband mode, wherein the subset of baseband channels carry wireless communication information;
   configuring the remote unit to operate in a measurement receiver mode; and
   transmitting, by the remote unit, wideband data to the head-end unit or the extension unit of the distributed antenna system based on the remote unit being configured to operate in the measurement receiver mode, wherein the wideband data includes measurement data for the subset of baseband channels and additional baseband channels other than the subset of baseband channels for use by the head-end unit to modify a configuration of the distributed antenna system.

2. The method of claim 1, wherein the remote unit switches between the baseband mode and the measurement receiver mode periodically.

3. The method of claim 1, wherein the remote unit transmits the subset of baseband channels and the wideband data within a common transmit frame by removing one or more RF streams carrying baseband data from the transmit frame and including the wideband data within the transmit frame.

4. The method of claim 1, wherein the subset of baseband channels is included in a first grouping of IQ data and the wideband data is included in a second grouping of IQ data, and wherein the first grouping of IQ data and the second grouping of IQ data are part of a plurality of RF streams associated with a transmit frame.

5. The method of claim 4, wherein the first grouping of IQ data and the second grouping of IQ data are respectively included on a first RF stream and a second RF stream during a first time period, and wherein the first grouping of IQ data is attenuated and the second grouping of IQ data is included on the first RF stream during a second time period.

6. The method of claim 1, further comprising:
   transmitting, by the remote unit, a beacon to one or more additional remote units based on the remote unit being configured to operate in the measurement receiver mode; and
   determining a relative position of the remote unit to the one or more additional remote units.

7. The method of claim 1, further comprising:
   receiving, by a receiving antenna, the wideband data based on the remote unit being configured to operate in the measurement receiver mode, wherein the wideband data comprises a wideband noise including a pseudo-random sequence; and
   determining one or more performance factors of the distributed antenna system by calculating an impulse response between the remote unit transmitting the wideband data and the receiving antenna.

8. The method of claim 1, wherein the wideband data comprises a second set of baseband channels transmitted by additional remote units, and further comprising identifying a neighboring macro-cell by scanning for a broadcast control channel within the received wideband data and optimizing one or more DAS parameters for the distributed antenna system that are associated with hand-over to the neighboring macro-cell.

9. A distributed antenna system, comprising:
   a remote unit configured to:
      switch between a baseband mode and a measurement receiver mode,
      transmit a subset of baseband channels based on being configured to operate in the baseband mode, and transmit wideband data based on being configured to operate in the measurement receiver mode; and a head-end unit communicatively coupled to the remote unit and configured to:
switch between the baseband mode and the measurement receiver mode,
receive the subset of baseband channels transmitted by the remote unit based on being configured to operate in the baseband mode, and
receive the wideband data transmitted by the remote unit based on being configured to operate in the measurement receiver mode,
wherein the subset of baseband channels carry wireless communication information and wherein the wideband data includes measurement data for the subset of baseband channels and additional baseband channels other than the subset of baseband channels for use by the head-end unit to modify a configuration of the distributed antenna system.

10. The distributed antenna system of claim 9, wherein the remote unit and the head-end unit are configured to switch between the baseband mode and the measurement receiver mode periodically.

11. The distributed antenna system of claim 9, wherein, based on being configured to operate in the measurement receiver mode, the remote unit is further configured to transmit the subset of baseband channels and the wideband data within a same transmit frame by removing one or more RF streams carrying baseband data from the transmit frame and including the wideband data within the transmit frame.

12. The distributed antenna system of claim 9, wherein the remote unit is further configured to transmit the subset of baseband channels included in a first grouping of IQ data and the wideband data is included in a second grouping of IQ data, and wherein the first grouping of IQ data and the second grouping of IQ data are part of a plurality of RF streams associated with a transmit frame.

13. The distributed antenna system of claim 12, wherein the first grouping of IQ data and the second grouping of IQ data are respectively included on a first RF stream and a second RF stream during a first time period, and wherein the first grouping of IQ data is attenuated and the second grouping of IQ data is included on the first RF stream during a second time period.

14. The distributed antenna system of claim 9, wherein the remote unit is configured to transmit a beacon to at least one additional remote unit based on being configured to operate in the measurement receiver mode, and wherein the head-end unit is configured to determine a relative position of the remote unit to the at least one additional remote unit based on being configured to operate in the measurement receiver mode.

15. The distributed antenna system of claim 9, further comprising:
a second remote unit communicatively coupled to the head-end unit and configured to receive the wideband data and determine one or more performance parameters of the distributed antenna system by calculating an impulse response between the remote unit and the second remote unit, wherein the wideband data comprises a wideband source including a pseudo-random sequence.

16. The distributed antenna system of claim 9, wherein the wideband data comprises a second set of baseband channels transmitted by a second remote unit, wherein the second remote unit is within a coverage zone of a neighboring macro-cell, and wherein the head-end unit, based on being configured to operate in the measurement receiver mode, is configured to receive the wideband data and identify the neighboring macro-cell by scanning for a broadcast control channel within the received wideband data.

17. A head-end unit of a distributed antenna system, comprising:
a processing device configured to select a baseband mode or a measurement receiver mode; and
a communications interface configured to communicate a subset of baseband channels with one or more remote units based on the processing device selecting the baseband mode, and communicate a wideband data with the one or more remote units based on the processing device selecting the measurement receiver mode, wherein the subset of baseband channels carry wireless communication information and wherein the wideband data includes measurement data for the subset of baseband channels and additional baseband channels other than the subset of baseband channels for use by the head-end unit to modify a configuration of the distributed antenna system.

18. The head-end unit of claim 17, wherein processing device is configured to switch between the baseband mode and the measurement receiver mode periodically.

19. The head-end unit of claim 17, wherein the processing device is further configured to determine one or more active channels included in the wideband data based on the processing device selecting the measurement receiver mode.

20. The head-end unit of claim 17, wherein the wideband data comprises a wideband noise including a pseudo-random sequence, and wherein the processing device is configured to determine one or more performance factors of a multipath environment by calculating an impulse response of the multipath environment based on the wideband noise.

* * * * *